United States Patent
Qi et al.

(10) Patent No.: US 8,335,937 B2
(45) Date of Patent: Dec. 18, 2012

(54) METHOD AND SYSTEM FOR DISCOVERABILITY OF POWER SAVING P2P DEVICES

(75) Inventors: Emily H. Qi, Portland, OR (US); Oren Kaidar, Hillsboro, OR (US); Marc Meylemans, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 12/647,139

(22) Filed: Dec. 24, 2009

(65) Prior Publication Data

US 2011/0161697 A1 Jun. 30, 2011

(51) Int. Cl.
  *G06F 1/32* (2006.01)
  *G06F 7/00* (2006.01)
(52) U.S. Cl. ......... 713/320; 713/300; 713/310; 707/622
(58) Field of Classification Search .................. 713/300, 713/320, 310; 707/622
  See application file for complete search history.

(56) References Cited

U.S. PATENT DOCUMENTS

| | | | |
|---|---|---|---|
| 6,665,520 B2 * | 12/2003 | Romans | 455/13.4 |
| 7,509,131 B2 | 3/2009 | Krumm et al. | |
| 7,613,156 B2 | 11/2009 | Ritle et al. | |
| 8,064,411 B2 * | 11/2011 | Ecclesine | 370/337 |
| 2007/0171910 A1 * | 7/2007 | Kumar | 370/392 |
| 2010/0232330 A1 * | 9/2010 | Cheng et al. | 370/311 |

FOREIGN PATENT DOCUMENTS

KR 10-1025371 3/2011

OTHER PUBLICATIONS

Search Report and Written Opinion for PCT/US2010/058663 mailed on Aug. 24, 2011.
International Preliminary Report on Patentability for International Application No. PCT/US2010/058663, mailed Jul. 5, 2012; 6 pages.

* cited by examiner

*Primary Examiner* — Kim Huynh
*Assistant Examiner* — Zahid Choudhury
(74) *Attorney, Agent, or Firm* — Shichrur & Co.

(57) ABSTRACT

In a method and system, a first wireless device may be periodically cycled between an available state and a power saving state. While in the available state, the first wireless device may receive a probe request sent from a second wireless device operating in a discovery state. The first wireless device may transmit a probe response to the second wireless device. Other embodiments are described and claimed.

19 Claims, 5 Drawing Sheets

Discoverable P2P Group Owner

P2P Device in Search State

Discoverable P2P Group Client Device

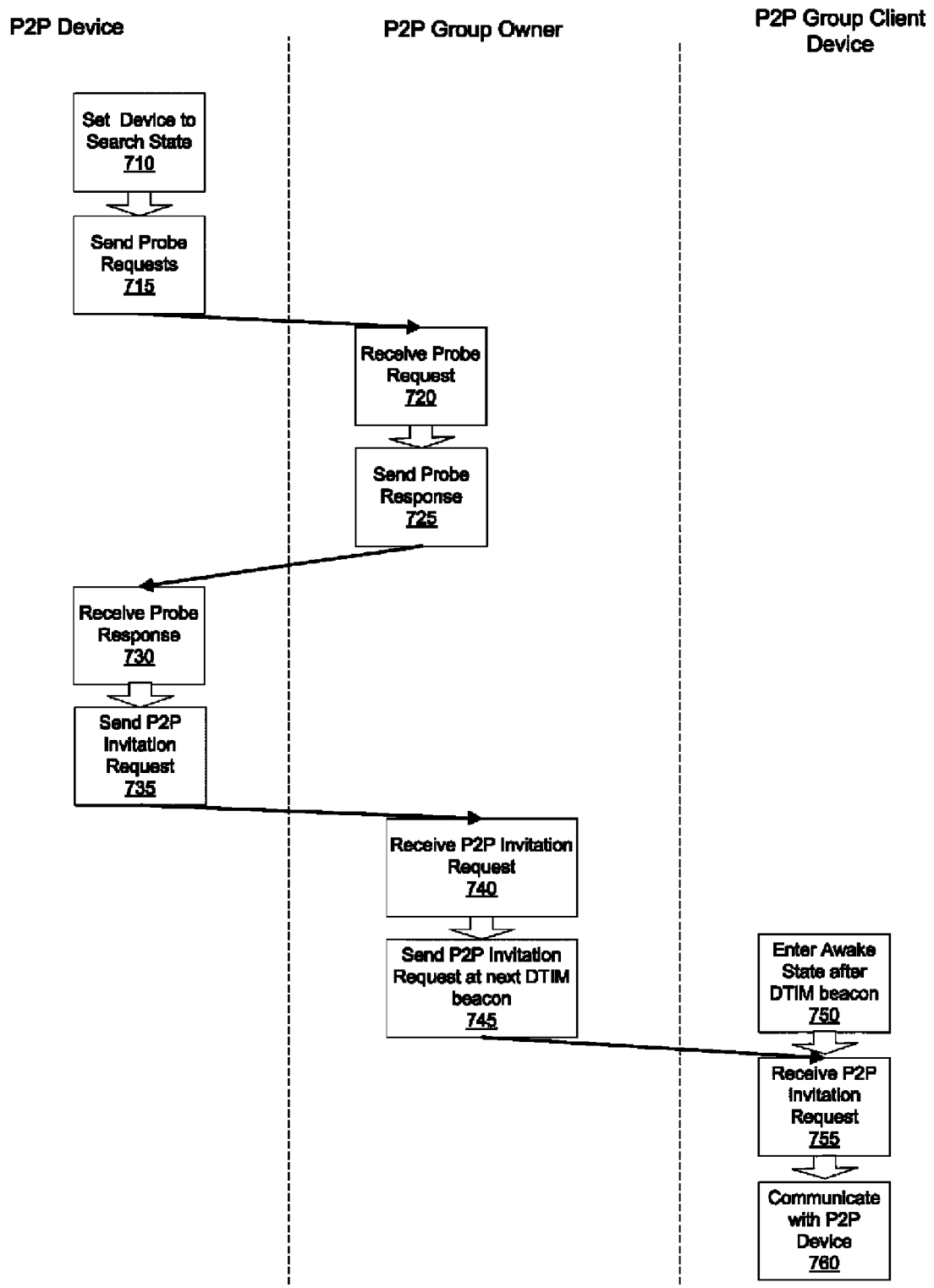

METHOD AND SYSTEM FOR DISCOVERABILITY OF POWER SAVING P2P DEVICES

BACKGROUND

As the number of mobile wireless devices increases, there is an increasing need for these devices to connect to each other directly, for example in a peer-to-peer (P2P) network. To connect to each other, a first device may transmit a signal. A second device may be listening for the signal and may subsequently transmit a response to that signal. However, the amount of power consumed by a device while listening for a signal reduces power available for other operations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 7 is a flowchart of a method for discovering a P2P group client device according to an embodiment of the invention.

Figure 1:
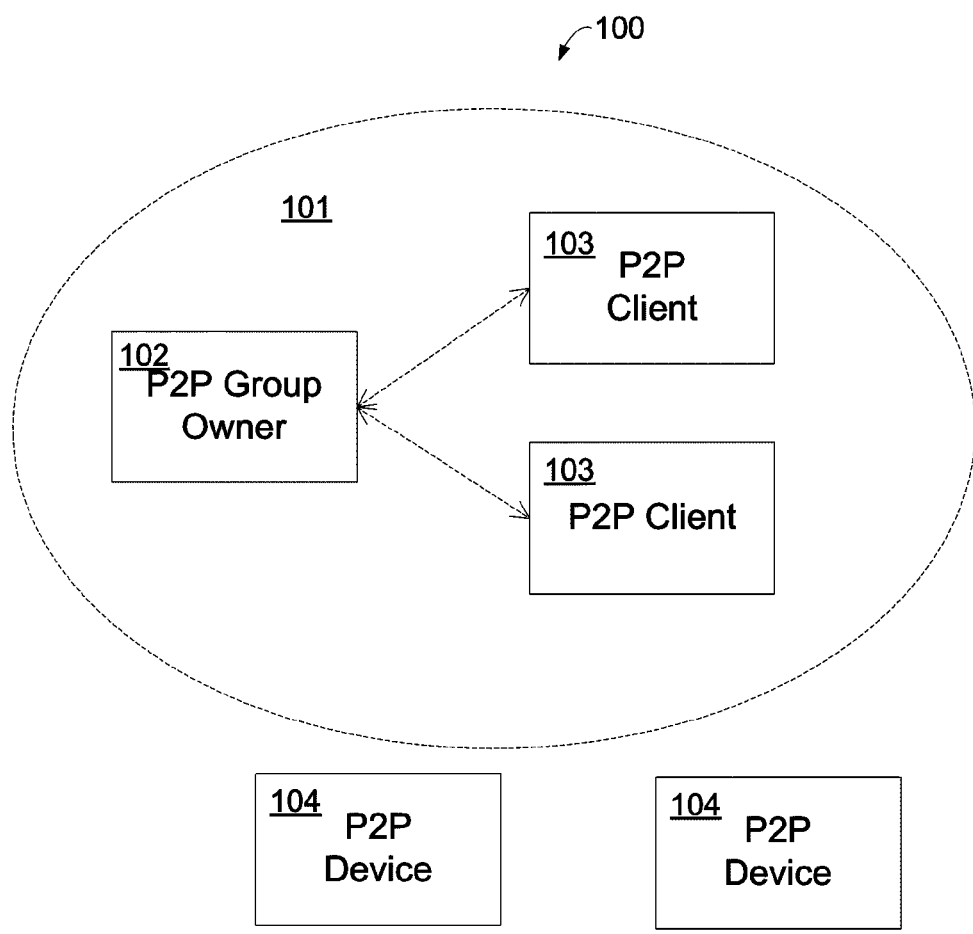
FIG. 1 is a schematic illustration of a wireless system according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer, processor, or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

As used herein, a power saving state or mode may be or include any operating state or mode of a device such as a P2P device that reduces the amount of power consumed by the device from a higher power operating state or mode. Such power saving states or modes may also be referred to as a reduced power, dozing, low power, sleep, and other lower power terminology as known while higher power operating states or modes may also be referred to as for example awake, full power, available, active, and other terminology as known. Different devices may have different and/or multiple power saving states that may or may not depend on the device type. For example, a monitor may operate in a power saving mode by not illuminating the screen when no new signal is present, and a personal computer may shut down a hard drive or reduce the power consumed by the processor after there has been no user input for a specified amount of time. Different devices may also have different criteria for entering a power saving state such as for example a timer timeout, change in input, time of day trigger, user input, low battery charge condition, etc. as known. These changes in operation incurred by entering a power saving state from an awake, available or other higher power operating state may, in some embodiments, also include or may be a reduction in the power consumed by the radio or transceiver portion of the device which may be or include for example a wireless card or network interface card (NIC). Specifically, the radio unit, or a portion of the transceiver, may be turned off to conserve power and/or may not be able to receive a signal while a device is in a power saving state or mode, or portions of the radio or transceiver unit may be put into a sleep state.

It should be understood that the present invention may be used in a variety of applications. Although the present invention is not limited in this respect, the circuits and techniques disclosed herein may be used in many apparatuses such as personal computers, network equipment, stations of a radio system, wireless communication system, digital communication system, satellite communication system, and the like.

Stations, nodes and other devices intended to be included within the scope of the present invention include, by way of example only, wireless LAN (WLAN) stations and/or nodes, metropolitan area network (MAN) stations and/or nodes, personal computers, peripheral devices, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), LAN, wide area network (WAN), or a global communication network, for example, the Internet.

Embodiments of the invention may include a method and system for power saving by P2P devices while maintaining availability or partial availability for establishing P2P wireless connections. One embodiment may include periodically cycling a first wireless device between an available state and a power saving state. A Probe Request sent from a second wireless device operating in a discovery state may be received at the first wireless device while operating in the available state. The first wireless device may transmit a Probe Response to the second wireless device.

A second embodiment may include at least a P2P group owner and at least one P2P group client. The P2P group owner may transmit a first group timing beacon having a first period and a second group timing beacon having a second period and synchronized to the first group timing beacon and having a duration being a multiple of the duration of the first period. The P2P group client may be cycled periodically between a P2P group client available state and a P2P group client power saving state. While in the available state, the P2P group client may receive a P2P Invitation Request from the P2P group owner. The P2P group client may transmit a Probe Response to the P2P group owner.

A third embodiment may be a system that includes at least a first wireless device and a second wireless device. The first wireless device may transmit a Probe Request while operating in a discovery state. The second wireless device may cycle periodically between an available state and a power saving state. While in the available state, the second wireless device may receive the Probe Request transmitted by the first wireless device. The second wireless device may transmit a Probe Response to the first wireless device.

Reference is now made to FIG. 1, a schematic illustration of a wireless system 100 according to an embodiment of the invention. System 100 may include a networked P2P group 101 that may include a group owner 102 and one or more group clients 103. System 100 may also include one or more P2P devices 104 that are not associated with P2P group 101.

In some embodiments, the wireless networking and P2P functional elements of system 100, e.g. group owner 102, group clients 103, and P2P device 104 may operate in accordance with one or more of the following standards and subsequent revisions, editions, and/or amendments as well as other standards for wireless networking:

ANSI/IEEE 802.11 Standard for Information technology-Telecommunications and information exchange between systems-Local and metropolitan area networks, and its associated group of standards, such as for example Part 11: Wireless LAN Medium Access Control (MAC) and Physical Layer (PHY) Specifications, Amendment 1 to Part 11, Amendment 3 to Part 11, P802.11u/D.8.0 Draft Standard, P802.11v/7.0 Draft Standard, and others.

Wi-Fi Alliance WMM™ Specification (including WMM™ Power Save) Specification version 1.1.

Wi-Fi Alliance Technical Committee P2P Task Group WiFi Peer-to-Peer (P2P) Technical Specification version 1.0

Networked P2P group 101 may be a set of one or more wired or wireless devices capable of interacting with other such devices to support device-to-device communication. Each of these devices may operate in accordance with for example the Wi-Fi Alliance WiFi Peer-to-Peer (P2P) Technical Specification and other networking or computing standards such as the IEEE 802.11 standards. These devices may include but are not limited to computers (such as personal computers, servers, media centers, mobile computers, mobile internet devices, etc.), computer input devices (such as keyboards, mouse, joystick, trackball, remote control, etc.), printers, scanners, facsimile machines, copiers, cameras, network storage devices, network infrastructure devices (such as access points, routers, switches, etc.), display devices, multimedia devices, gaming devices, telephones, and audio devices. Elements of networked P2P group 101 may concurrently support P2P and WLAN operation.

Networked P2P group 101 may have a single service set identifier (SSID) or other identifier (ID) and may provide a single security domain. The architecture of P2P group 101 includes at least a group owner 102 which may be for example any of the devices listed above, or another suitable device. Group owner 102 may serve as an access point (AP) like entity, for example to provide BSS like functionality and services for associated Clients including Wi-Fi Protected Setup (WPS) Registrar functionality, communication between associated Clients, and access to a simultaneous WLAN connection for associated Clients. Group owner 102 may also provide the functionality of its own device type such as for example a computer or a camera.

Networked P2P group 101 may also include one or more group clients 103 which may be any Wi-Fi Alliance (WFA) CERTIFIED™ device or similar device as listed above, or other suitable devices. As such group client 103 may be a P2P Client, e.g. a P2P Device, or a Legacy Client which may be WFA CERTIFIED™, but not P2P compliant. A group client 103 may serve as a WPS Enrollee and may implement non-AP STA functionality as well as provide the services of its respective device type (printer, monitor, etc.). In some embodiments, a P2P device may serve as either a group owner 102 or a group client 103. In these embodiments, the group owner and group client roles for P2P network operations may be determined by processes implemented according to one or more WFA and/or 802.11 standards and/or other suitable standards.

In some embodiments, System 100 may include one or more P2P devices 104 that may be any P2P device type as listed above (or other suitable devices) and may differ from group owner 102 or group client 103 in that a P2P device 104 is not associated with Networked P2P group 101. However, in some embodiments P2P device 104 may be associated with one or more other WLANs or P2P groups although the invention is not limited in this respect.

Figure 2:
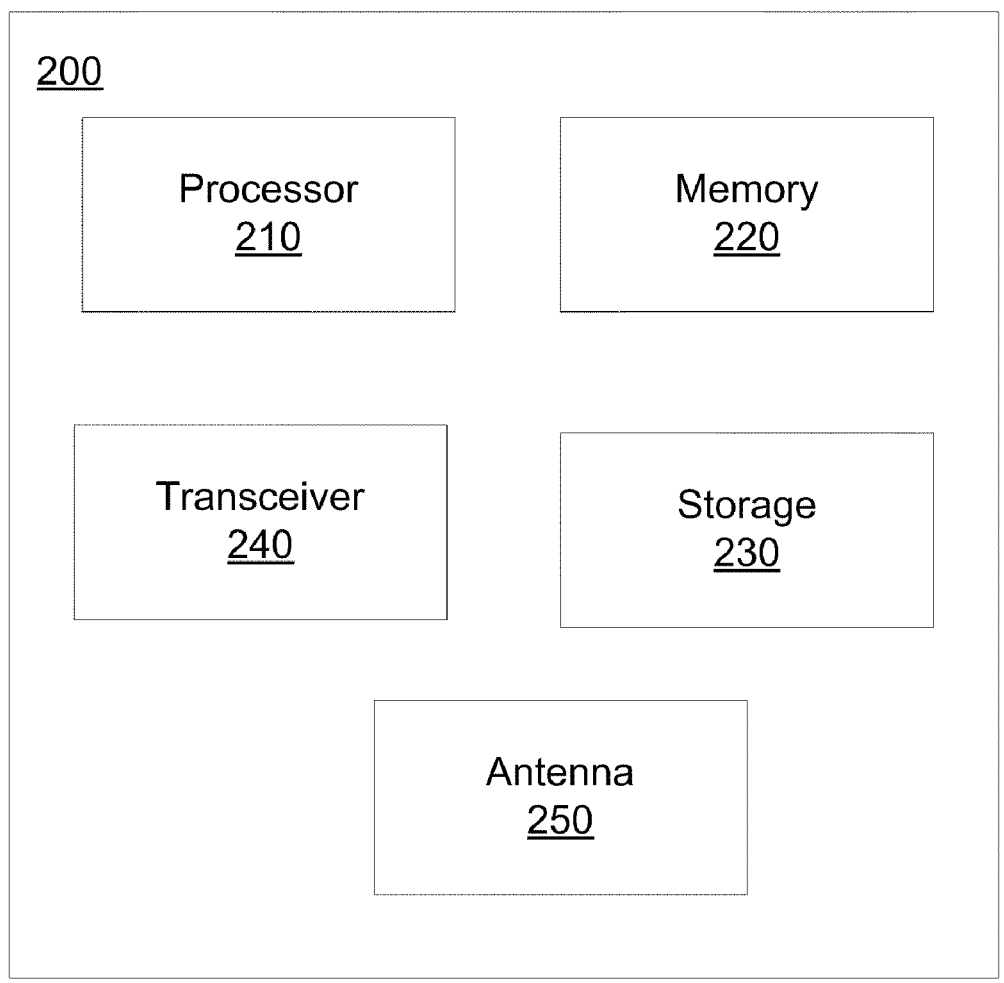
FIG. 2 is a block diagram of a P2P device according to an embodiment of the invention.

Reference is now made to FIG. 2 which is a block diagram of P2P device 200 according to an embodiment of the present invention. P2P device 200 may be any P2P device 104 for establish P2P connections with a networked P2P groups such as networked P2P group 101 and/or members of networked P2P group 101 and may be any P2P device in networked P2P group 101 such as for example group owner 102 or group client 103 in accordance with the present invention. The elements of P2P device 200 may include a controller or processor 210, a memory unit 220, a storage unit 230, a transceiver 240, and an antenna 250. Other elements such as for example elements needed for the non-AP STA or device type functionality of P2P device 200 like printing hardware or a monitor may also be included.

Although embodiments of the invention are not limited in this respect, processor 210 may include, for example, a central processing unit (CPU), a digital signal processor (DSP), a microprocessor, a controller, a chip, a microchip, an integrated circuit (IC), or any other suitable multi-purpose or specific processor or controller capable of implementing methods of the present invention. Memory unit 220 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 230 may include, for example, a hard disk drive, a floppy disk drive, a compact disk (CD) drive, a CD-ROM drive, a digital video disk (DVD) drive, or other suitable removable or non-removable storage units. In some embodiments, instructions may be recorded or stored, for example, in storage unit 230 and may be executed by processor 210 to perform one or methods in accordance with an embodiment of the invention. Embodiments of the invention may include an article such as a computer or processor readable medium (e.g., storage unit 230, or another unit), or a computer or processor storage medium, such as for example a memory, a disk drive, or a USB flash memory, encoding, including or storing instructions, e.g., computer-executable instructions, which when executed by a processor or controller (e.g. processor 210), carry out methods disclosed herein.

Transceiver 240 may be or include a single transceiver unit for wireless communication or alternatively may include a separate transmitter and receiver or other combination of components that may be adapted to send and receive multi-carrier modulated signals although the invention is not limited in this respect. In some embodiments transceiver 240 may be configured to be compatible with one or more IEEE 802.11 standards and/or other standards and/or specifications. In some embodiments, transceiver 240 may be or may be a part of a network interface or other wireless card or adapter as known. Further, in some embodiments, transceiver 240 may operate in a full power, awake, or available state and may be adapted to operate in a power saving state.

Although the invention is not limited in this respect, antenna 250 may include or may be an internal and/or external radio frequency antenna, for example, a dipole antenna, a monopole antenna, an omni-directional antenna, an end-fed antenna, a circularly polarized antenna, a micro-strip antenna, a diversity antenna, or any other type of antenna suitable for transmitting and/or receiving wireless communications.

In addition to group operation, P2P devices such as group owner 102, group client 103, and P2P device 104 may support several other P2P functions including but not limited to P2P Device Discovery and P2P Power Management. Other P2P functions are also possible.

P2P Device Discovery is the process by which a P2P device may identify and connect to another P2P device. The process may use different types of data frames for exchanging device information, e.g. Probe Requests or P2P Invitation Requests containing identifiers of the originating P2P device and Probe Responses containing identifiers of the responding P2P device, P2P group owner, and/or P2P group clients associated with a P2P group owner, although the present invention is not limited in this respect. Other types of data frames may also be used and other information pertaining to P2P device communications or device functionality may also be included in the Probe Requests, P2P Invitation Requests and Probe Responses.

P2P devices may communicate with each other on one or more fixed sets of communications channels in one or more different frequency bands such as for example the 2.4 GHz and 5.0 GHz bands as specified by one or more IEEE 802.11 standards. Each frequency band may have its own set of pre-assigned channel allocations for communications. In some embodiments, certain channels in a frequency band may designated as social channels, e.g. channels which are designated for use in the discovery process. For example, in the 2.4 GHz frequency band, channels 1, 6, and 11 may be designated as social channels. Different channels and different numbers of channels may also be used within the scope of the present invention.

During P2P Device Discovery, a P2P device may attempt to find another P2P device to which it will attempt a connection using either a Scan Phase or a Find Phase, although other phases are possible. The Scan Phase may use a scanning process defined for example in IEEE Standard 802.11-2007 or similar scanning process to collect information about one or more P2P devices and/or P2P groups by scanning all supported channels. The Find Phase may use a combination of a Search State and a Listen State to ensure that two P2P devices arrive on a common channel to enable communication. In some embodiments, a P2P device attempting to find another P2P device may cycle between the Search State and the Listen State repeatedly or periodically until contact has been made, and/or another P2P device may switch to the Listen State to be available for contact repeatedly or periodically.

In the Search State, a P2P device may transmit Probe Requests on one or more channels such as for example the social channels, although other names for the Search State and other states in which a P2P device may transmit Probe Requests are also possible. In the Listen State, a P2P device may wait on a fixed communication channel for Probe Requests, although other names for the Listen State and other states in which a P2P device may wait on a fixed communication channel for Probe Requests or be available to receive Probe Requests, e.g. receive and process Probe Requests are also possible. A P2P device in the Search State may transmit one or more Probe Requests on a channel and switch to the Listen State to await a Probe Request from another P2P device. A P2P device in the Listen State may listen on a channel waiting for a Probe Request. Other connection mechanisms are also possible.

In some embodiments, the amount of time that a P2P device spends in the Search and/or Listen States may depend on whether the P2P device is an element of a P2P group such as networked P2P group 101 or its role in a networked P2P group 101, e.g. group owner 102 or group client 103, or is unassociated with a P2P group such as P2P device 104. Furthermore, the channels on which a P2P device searches or listens may depend on whether or not the device is associated with a P2P group. Additionally, in some embodiments other aspects of P2P discovery may also depend on a P2P device's P2P group status.

For example, a P2P device may take for example 10 msec to transmit one or more Probe Requests on one of social channels 1, 6, and 11 in the 2.4 GHz range and then wait for example 20-30 msec for a response, although these durations may vary. The P2P device may switch sequentially to the second and third social channels for a total transmit/wait duration of 60-120 msec. The P2P device may then switch to the Listen State for a period of time such as for example 300 msec to receive Probe Requests. This duration spent in the Listen State may, in some embodiments, be a random integer between for example 1 and 3 of 100 time units such as msec. Other durations for the amount of time a P2P device in the Find Phase may remain in the Listen State are also possible. In some embodiments, a P2P device may switch to a different group of channels or a different frequency range such as for example from the 2.4 GHz range to the 5.0 GHz and continue transmitting Probe Requests on a different set of channels. In some embodiments, the amount of time that a P2P device in the Listen State spends listening for Probe Requests for a set of one or more channels may depend on a random integer used to multiply 100 msec or other time units (TU) with a maximum and a minimum value of the random integer for example of 3 and 1 respectively. Other bases for determining the amount of time a P2P device spends in the Listen State are also possible.

P2P power management functions may be a set of functions to reduce power consumption of P2P devices such as for example group owner 102, group client 103, and P2P device 104. In the prior art, P2P devices that operate in a power saving mode or state, e.g. dozing or asleep, or similar states in which the amount of power consumed by a P2P device is reduced, may be unavailable for discovery, e.g. they cannot respond to Probe Requests. Embodiments of the present invention may avoid this problem by introducing a state such as a Discoverable State in which a P2P device in a reduced power or power saving state may cycle to a state available for receiving for example a Probe Request or a P2P Invitation Request, e.g. capable of receiving a Probe Request or P2P Invitation Request, processing it, and transmitting a Probe Response, for some percentage of time and cycle back to the reduced power or power saving state if for example no Probe Request is received. While certain states or modes are referred to herein by certain names (e.g., Discoverable State or partially available state), other names may be used.

In some embodiments, the percentage of time and timing of a P2P device's listening in the Discoverable State may depend on the P2P device's P2P group status, e.g. group owner, group client, or unassociated with a P2P group. For example, the percentage of time that a P2P group client is awake, e.g. in an available state or the pattern or cycle of its waking/sleeping may depend on the duration of one or more timing cycles associated with P2P group operation and the timing of the listening may be synchronized with one or more beacons. Other references for the duration and timing of listening in the Discoverable State are also possible.

Figure 3:
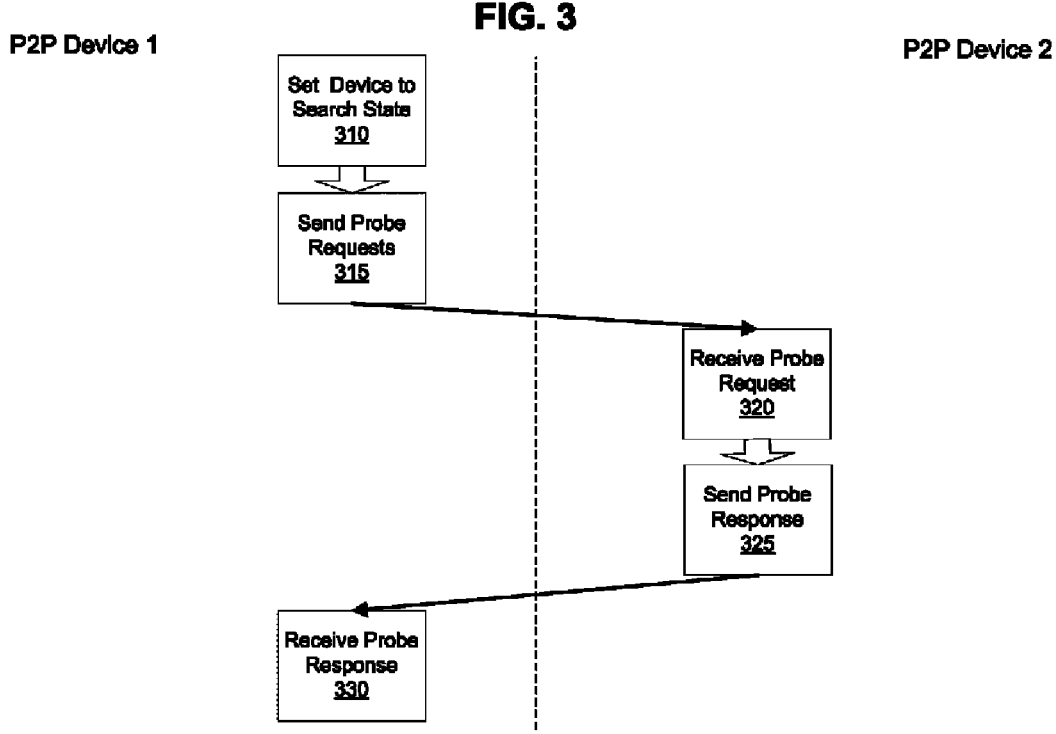
FIG. 3 is a flowchart of a method for discovering a P2P device according to an embodiment of the invention.

Reference is now made to FIG. 3 which is a flowchart of a method for discovering a P2P device according to an embodiment of the invention. Embodiments of the method may be used by, or may be implemented by, for example, a first P2P Device (P2P Device 1) which may be P2P device 104 of FIG. 1 operating in a Search State or by other suitable components of P2P devices, stations, nodes, systems or network entities. By employing the embodiment shown in FIG. 3, P2P device 104 may be able to discover a second P2P device (P2P Device 2 in FIG. 3) which may be a second P2P device 104 or P2P group owner 102. In some embodiments of the invention, the second P2P device may be operating in a reduced power or power saving state and may be in a Discoverable State with limited availability for discovery.

A P2P device such as for example P2P device 104 may require services from or may simply seek to communicate with another P2P device and may seek to establish a connection to another P2P device. To find such a device, the P2P device may be configured to initiate the Find Phase of the discovery process. In operation 310, P2P device 104 may be configured to operate in the Search State. While in the Search State, P2P device 104 may transmit or send one or more Probe Requests on one or more different channels (Operation 215). In some embodiments the contents of the Probe Request may include for example one or more of the following: Service Set Identifiers (SSIDs), WPS information elements (IEs), requested device type attributes, destination address, and other data as specified for example in WFA P2P standards. Probe requests with different content may also be sent.

In some embodiments, P2P device 104 may send a first Probe Request, wait a first period of time, optionally send a second Probe Request on a second channel, wait a second period of time, and optionally send a third Probe Request and wait a third period of time. In other embodiments, P2P device 104 may send a different number of Probe Requests, other than one, two, or three. For example, P2P device 104 may send out three Probe Requests one each on social channels 1, 6, and 11 in the 2.4 GHz frequency band with a waiting period after each request. The duration of each Probe Request may be less than 10 msec, and the wait period may be 20-40 msec, such that each combination of sending and waiting may take for example 40 msec and the total for all three combinations may be for example 120 msec. Other numbers of Probe Requests, durations of sending, and durations of waiting are also possible.

In operation 320 a second P2P device such as for example group owner 102 or a second P2P device 104 may receive the Probe Request from P2P device 104. To be available for receiving a Probe Request, group owner 102 may be in a Discovery State, e.g. one in which a P2P device is operating in an awake, available, non-reduced or normal power consuming state, or in a Discoverable State, e.g. one in which a P2P device operating in a reduced power or power saving state (e.g., sleep, power save, etc.) may cycle repeatedly or periodically to a state in which it is available for listening some percentage of time. Other operating states in which a receiving P2P device may be available to receive Probe Requests may also be possible.

Upon receiving a Probe Request, group owner 102 may send a Probe Response to P2P device 104 (operation 325). This Probe Response may include for example P2P device capability, P2P device information, P2P group information, and other data as specified for example in WFA P2P specifications. Additionally, if the responding P2P device is in the Discoverable State, it may switch to a different operating state to continue communicating with the requesting P2P device.

In operation 330, P2P device 104 may receive the Probe Response, e.g. receive and process the resulting in a successful device discovery. In some embodiments at this point, P2P device 104 and group owner 102 may engage in for example one or more ongoing exchanges of device information, a service discovery process in which higher-layer services may also be discovered, a group formation process, and/or a P2P invitation in which P2P device 104 may be invite to join Networked P2P group 101. Other activities involving additional communications between P2P device 104 and group owner 102 are also possible.

Figure 4:
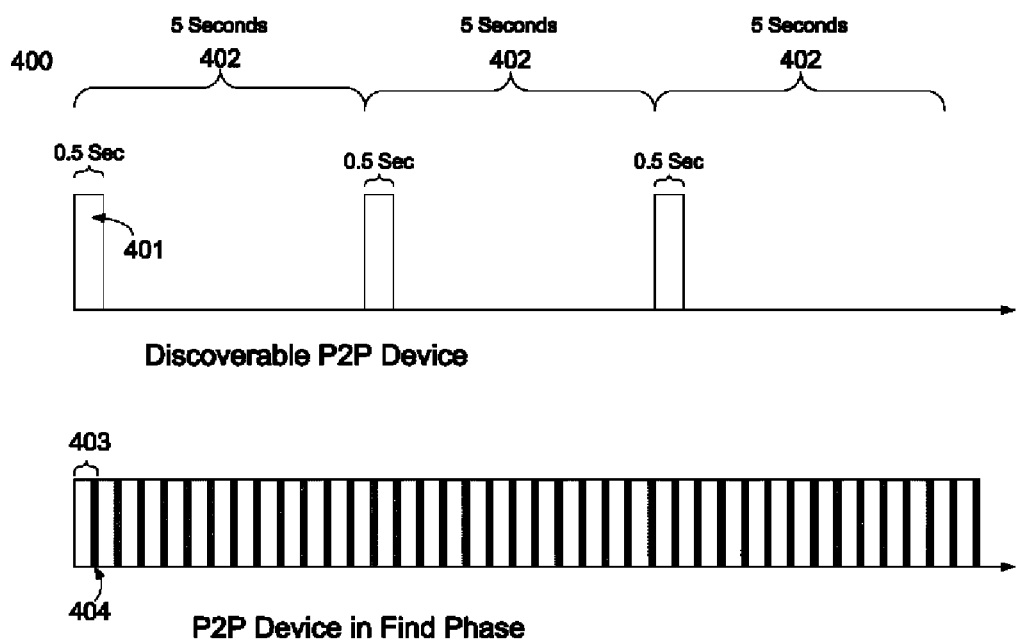
FIG. 4 is a signal flow diagram illustrating signal timing for discovery of a P2P device that is not in a P2P group and that may be operating in a discoverable state, according to an embodiment of the invention

Reference is now made to FIG. 4 which illustrates signal timing 400 for discovery of a P2P device such as for example a second P2P device 104 that is not in a P2P group such as for example networked P2P group 101 and that may be operating in a Discoverable State according to an embodiment of the invention. In some embodiments, a P2P device in the Search State of the Find Phase such as for example a first P2P device 104 may attempt to contact a P2P device such as a second P2P device 104 operating with reduced power consumption in a Discoverable State using a method such as in the embodiment of FIG. 3. To be available for discovery, the discoverable device may operate in the Listen State or other available state for as an example at least 10% of the total operating time in a periodic pattern, e.g. a regularly repeating pattern, steady duty cycle, repetitive cyclic pattern, etc. although other percentages are also possible. For example, a discoverable P2P device operating according to the embodiment of FIG. 4 may have a contiguous listening period 401 of 500 msec every 5 sec period 402, e.g. repeatedly staying in the Listen State for 500 msec, in a power saving state for 4500 msec, in the Listen State for 500 msec, in a power saving state for 4500 msec, etc., in a regular cyclic or repetitive pattern although other durations for listening period 401 and period 402 are also possible. At the same time, a P2P Device in the Find Phase may step through transmitting Probe Requests in the Search State on the three social channels at 2.4 GHz and listening in the Listen State over a find cycle 403 and repeat this cycle of Search State and Listen State until for example a Probe Response is received or other criterion for ending the Find Phase is met. With this amount of availability in a discoverable P2P device and this duration for find cycle 403, there may be an overlapping period 404 of find cycle 403 with listening period 401 of the P2P device operating in the Discoverable State, thereby enabling discovery of the P2P device operating in the Discoverable State.

In some embodiments, a minimum duration of the availability for a P2P device in the Discoverable State may be determined by the minimum duration a P2P device maybe in the Find Phase or the amount of time a P2P device in the Find Phase requires to step through a single find cycle of the Search State and the Listen State. In the embodiment of FIG. 4, a minimum duration of the discoverable P2P device's availability may be at least the duration of find cycle 403, e.g. one duration of the Search and Listen State although other durations are possible.

Figure 5:
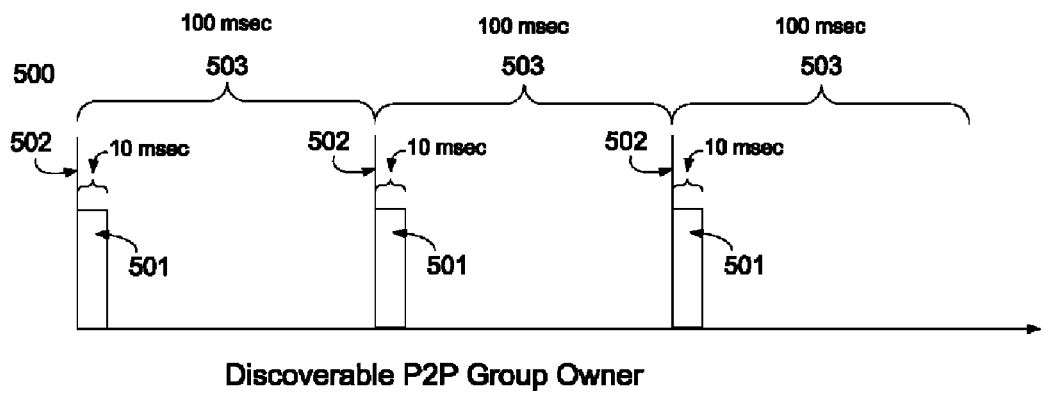
FIG. 5 is a signal flow diagram illustrating signal timing for discovery of a P2P group client device that is a P2P group owner and that may be operating in a discoverable state, according to an embodiment of the invention.
Figure 5:
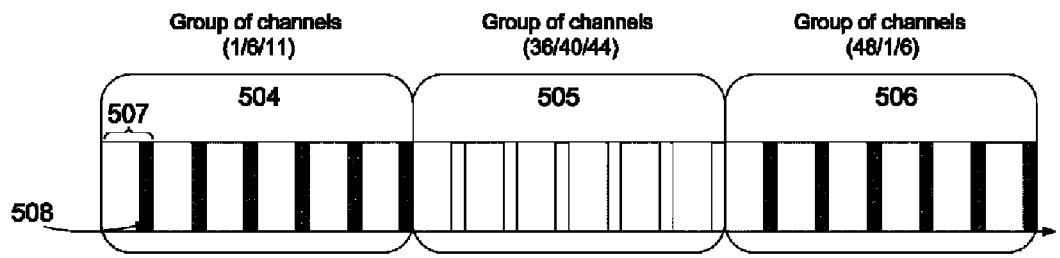

Reference is now made to FIG. 5 which illustrates signal timing 500 for discovery of a P2P device such as for example group owner 102 that may be the group owner of a P2P group such as for example networked P2P group 101 and that may be operating in a Discoverable State, according to an embodiment of the invention. A P2P device in the Search State such as P2P device 104, may attempt to contact a P2P device such as group owner 102 operating that may cycle repeatedly through a reduced power consumption or reduced availability state and a Discoverable State using for example the operations in the embodiment of FIG. 3. In some embodiments, a group owner 102 operating with reduced power consumption may be available, e.g. in the Listen State or other available state, for limited periods of time that may be defined for example by a P2P power management protocol. In some embodiments, the period of available time 501, which may also be referred to by other names such as for example a window of availability, may be tied or synchronized to for example a periodic timing beacon 502 that repeats each timing period 503 and may have a duration of at least 10% of timing period 503. For example, timing period 503 may be the time between Target Beacon Transmission Times (TBTTs), as defined by one or more IEEE 802.11 standards, having a spacing of 100 msec or other time units. In this instance, the period of available time 501 may begin at timing beacon 502 and last for at least 10 msec or other time units, and then repeat periodically, e.g. in a regular pattern. Other beacon timings, periods, initiation timing, and durations are also possible.

In the embodiment shown in FIG. 5, a P2P device in the Find Phase, e.g. P2P device 104 may be searching for a discoverable device that may be for example a partially available P2P group owner, e.g. a P2P group owner in the Discoverable State in both the 2.4 GHz band and the 5.0 GHz band as defined by the IEEE 802.11 Standard (or other bands). Each of the search cycles 504-506 may cover for example a different set of three (or any other number of) channels in either of these frequency bands. For example, search cycle 504 may cover the social channels 1, 6, and 11; search cycle 505 may cover channels 36, 40, and 44; and search cycle 506 may cover channels 48, 1, and 6. Other groups of channels and numbers of channels may also be covered in each search cycle. In some embodiments, the length of a search cycle such as search cycle 504 may be longer than the duration of timing period 503 to ensure sufficient overlap between search cycle 504 and the availability of the discoverable P2P group owner.

As with the embodiment of FIG. 4, P2P device 104 may step or cycle repeatedly through transmitting Probe Requests on for example a set of three channels in a search cycle with a duration greater than for example timing period 503. For each channel, the P2P device in the Search State may use a probe interval 507 to send one or more Probe Requests on at least one channel. The duration of probe interval 507 may be equal to or less than the duration of the period of available time 501 of the discoverable P2P device to ensure that at least one Probe Request falls within the period of available time 501. In some embodiments, the P2P device in the Search State may send multiple Probe Requests on multiple channels within the period of available time 501, but must send at least one Probe Request during this window of availability to ensure discoverability. Period 508 may then represent the amount of time in which the P2P device in the Search State actively scans in the operating channel of the P2P device in the Discoverable State. Other time periods, windows, periods, periods of availability, etc. are also possible.

In some embodiments, a P2P device 104 may be seeking the services of a client of group owner 102 such as for example group client 103. In these embodiments, it may be necessary for P2P Device to discover or connect with group client 103. In the prior art, if group client 103 is in a power-saving state, such a connection may not be possible. Some embodiments of the present invention may avoid this with a Discoverable State for group client 103 that capitalizes on the timing cycle used by group owner 102 for maintaining one or more group management functions of networked P2P group 101.

Figure 6:
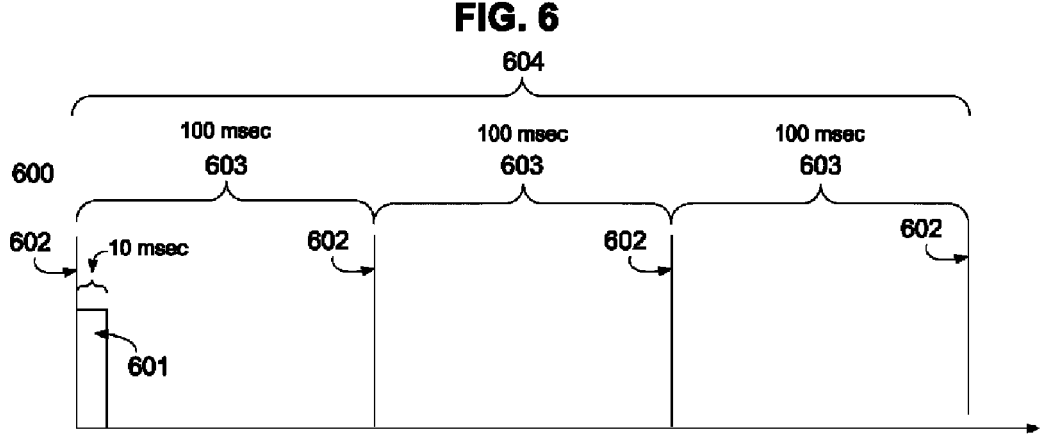
FIG. 6 is a signal flow diagram illustrating signal timing for discovery of a P2P group client that may be operating in a discoverable state according to an embodiment of the invention.

Reference is now made to FIG. 6 which illustrates signal timing 600 for discovery of a P2P group client such as for example group client 103 that may be operating in a Discoverable State according to an embodiment of the invention. In the embodiment of FIG. 6, a period of available time 601 may be initiated at TBTT or message 602. Although beacons may repeat at a timing period 603 having an interval of for example 100 msec as defined by the IEEE 802.11 Standard, a discoverable group client may not be available or awake every TBTT 602. Instead an additional timing beacon may be utilized to synchronize the timing of traffic delivery and may be a Delivery Traffic Indication Message (DTIM) time with a DTIM interval or period 604. The DTIM time may be a time at which group client 103 may receive a traffic indication message and any pending traffic from its group owner 102. In some embodiments, the DTIM time may be in accordance with an IEEE 802.11 Standard, although other timing intervals or timing beacons for coordinating group operations may be used. The duration of DTIM period 604 may be an integral number or multiple of beacon periods or other group timing function intervals such as for example the time span between 3 TBTTs. Thus, timing period 603 may have a duration of 100 msec, DTIM period 604 may have a duration of 300 msec, and the periodic cycling of the P2P group client may be synchronized to a multiple of a group timing function such as the DTIM time. Other durations of DTIM period 604, other beacon, periods, intervals, initiation timing, and durations are also possible.

A group client 103 that is operating at a reduced power consumption level, e.g. dozing, etc., may use the DTIM time as a timing indicator for when it should be available or awake. For example, a dozing group client 103 may be available for 10 msec at every DTIM time. With this level of availability, a dozing group client 103 may be capable of responding to a P2P Invitation Request from a P2P device 104.

Reference is now made to FIG. 7 which is a flowchart for discovering a P2P group client device such as for example group client 103 that may be operating in a dozing, e.g. reduced power consumption state according to an embodiment of the invention. Embodiments of the method may be used by, or may be implemented by, for example, a first P2P Device which may be P2P device 104 of FIG. 1 operating in the Search State or by other suitable components of P2P devices, stations, nodes, systems or network entities. By employing an embodiment as described in FIG. 7, P2P device 104 may be able to discover a P2P group client device which may be a group client 103 by communicating first with a P2P group owner such as for example group owner 102. In some embodiments of the invention, the group client 103 and optionally group owner 102 may be operating in a reduced power state, e.g. dozing, and may be in a Discoverable State with limited availability for discovery.

In some embodiments, operations 710, 715, 720, 725, and 730 may proceed in a manner similar to operations 310, 315, 320, 325, and 330 as shown in FIG. 3. In the embodiment of FIG. 7, the contents of the Probe Request sent in operation 715 may be a device discoverability request and the response sent in operation 725 may contain information regarding one or more group clients of group owner 102 such as for example a P2P group Info subelement, e.g. a frame subsection containing information regarding the clients of a P2P group, as defined in the WFA P2P specification. After P2P device 104 receives the Probe Response in operation 730, P2P device 104 may elect to send a P2P Invitation Request for group client 103 to group owner 102 (operation 735). Upon receiving the P2P Invitation Request for group client 103 (operation 740), group owner may forward the P2P Invitation Request on to group client 103 in operation 745.

In some embodiments, P2P group owner 102 may begin transmission of the P2P Invitation Request to group client 103 immediately following the next DTIM time. Upon receiving this beacon, group client 103 may switch from a dozing state to an awake or other available state (operation 750). By switching to for example an awake state, group client 103 can then receive a P2P Invitation Request in operation 755. By synchronizing the availability of group client 103 (as shown in the embodiment of FIG. 6) and the transmission of the P2P Invitation Request by group owner 102 to the DTIM time, the use of an embodiment of the present invention may help assure that a dozing group client 103 may receive the P2P Invitation Request. Once group client 103 has received the P2P Invitation Request, it may then remain in the awake state for an extended period of time such as for example at least 100 msec to start communicating with the originating P2P device of the P2P Invitation Request (the P2P device that originated the P2P Invitation Request), e.g. P2P device 104 (operation 760), and/or send a Probe Response to group owner 102 although other operations may also occur. The communications with P2P device 104 may be or include a regular frame exchange as known such as for example an invitation response. Additional communications and other types of communications between group client 103 and P2P device 104 may also take place.

Other operations or series of operations may be used.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
periodically cycling a peer-to-peer (P2P) group client device between an available state and a power saving state during a discovery interval synchronized to a delivery traffic indication message (DTIM) interval of a DTIM period, the DTIM period including a period in which the P2P group client device is to receive a traffic indication message and pending traffic from a P2P group owner, wherein the DTIM interval is longer than a target beacon transmission time interval utilized for communication by the P2P group owner;
receiving at the P2P group client device a P2P invitation request from the P2P group owner while the P2P group client device is in the available state, the P2P invitation including an invitation from an other P2P device to communicate with the P2P group client device; and
communicating between the P2P group client and the other P2P device.

2. The method of claim 1, wherein the available state is synchronized with the DTIM period.

3. The method of claim 1, wherein the P2P group client device operates in accordance with one or more WiFi Alliance Specifications.

4. The method of claim 1, wherein the DTIM interval is an integer multiple of the target beacon transmission time interval.

5. The method of claim 1, wherein the other P2P device is not part of a P2P networking group including the P2P group client device and the P2P group owner.

6. The method of claim 1 comprising:
periodically cycling the P2P group owner between a P2P group owner available state and a P2P group owner power saving state; and
receiving at the P2P group owner the P2P invitation request from the other P2P device, when the P2P group owner is operating in the P2P group owner available state.

7. The method of claim 1, wherein the power saving state of the P2P group client device comprises a power saving state of a transceiver of the P2P group client device and the available state of the P2P group client device comprises an available state of the transceiver of the P2P group client device.

8. In a peer-to-peer (P2P) networking group that includes at least a P2P group owner and at least one P2P group client, a method comprising:
transmitting from the P2P group owner, a first group timing beacon having a first period, the first group timing beacon is synchronized to a target beacon transmission time;
transmitting from the P2P group owner, a second group timing beacon having a second period synchronized to a delivery traffic indication message (DTIM) time, wherein the second timing beacon is synchronized to the first group timing beacon and the duration of the second period is a multiple of the duration of the first period;
periodically cycling the P2P group client between a P2P group client available state and a P2P group client power saving state, wherein the cycling of the P2P group client between the P2P group client available state and the P2P group client power saving state is synchronized to the second group timing beacon, wherein when operating in the available state the P2P group client is to receive a traffic indication message and pending traffic at the DTIM time;

receiving at the P2P group client a P2P invitation request from the P2P group owner while the P2P group client is in the available state; and starting communications with a P2P device originating the P2P invitation request.

9. The method of claim 8, wherein the P2P group owner and the P2P group client operate in accordance with one or more WiFi Alliance Specifications.

10. The method of claim 8, further comprising:

receiving at the P2P group owner the P2P invitation request from a P2P device not associated with the networked P2P group.

11. The method of claim 8, further comprising:

periodically cycling the P2P group owner between a P2P group owner available state and a P2P group owner power saving state; and receiving at the P2P group owner the P2P invitation request from the P2P device, when the P2P group owner is operating in the P2P group owner available state.

12. The method of claim 11, wherein the periodic cycling of the P2P group owner is synchronized to the first group timing beacon.

13. A system comprising:

a peer-to-peer (P2P) group client device to periodically cycle between an available state and a power saving state during a discovery interval synchronized to a delivery traffic indication message (DTIM) interval of a DTIM period, the DTIM period including a period in which the P2P group client device is to receive a traffic indication message and pending traffic from a P2P group owner, wherein the DTIM interval is longer than a target beacon transmission time interval utilized for communication by the P2P group owner;

wherein the P2P group client device is to receive a P2P invitation request from the P2P group owner while the P2P group client device is in the available state, the P2P invitation including an invitation from an other P2P device to communicate with the P2P group client device, and based on the P2P invitation to communicate with the other P2P device.

14. The system of claim 13, wherein the P2P group client device operates in accordance with one or more WiFi Alliance Specifications.

15. The system of claim 13, wherein the available state is synchronized with the DTIM period.

16. The system of claim 13, wherein the DTIM interval is an integer multiple of the target beacon transmission time interval.

17. The system of claim 13, wherein the other P2P device is not part of a P2P networking group including the P2P group client device and the P2P group owner.

18. The system of claim 13 including the P2P group owner configured to periodically cycle between a P2P group owner available state and a P2P group owner power saving state, and to receive the P2P invitation request from the other P2P device, when the P2P group owner is operating in the P2P group owner available state.

19. The system of claim 18, wherein the periodic cycling of the P2P group owner is synchronized to the target beacon transmission time interval.

* * * * *